(12) United States Patent
Teramura et al.

(10) Patent No.: US 7,749,147 B2
(45) Date of Patent: Jul. 6, 2010

(54) AIRBAG FOLDING DEVICE AND AIRBAG FOLDING METHOD

(75) Inventors: Yoshimasa Teramura, Settsu (JP); Yoshio Shimazaki, Settsu (JP); Kou Sasaki, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 101 days.

(21) Appl. No.: 11/995,659

(22) PCT Filed: Jul. 10, 2006

(86) PCT No.: PCT/JP2006/313682
§ 371 (c)(1),
(2), (4) Date: Jan. 14, 2008

(87) PCT Pub. No.: WO2007/010776
PCT Pub. Date: Jan. 25, 2007

(65) Prior Publication Data
US 2009/0033079 A1    Feb. 5, 2009

(30) Foreign Application Priority Data
Jul. 15, 2005   (JP) .............................. 2005-206697

(51) Int. Cl.
*B31B 1/26* (2006.01)
(52) U.S. Cl. .................... 493/458; 493/457; 493/449
(58) Field of Classification Search ............... 493/458, 493/457, 449, 465; 280/743.1, 728.1
See application file for complete search history.

(56) References Cited

U.S. PATENT DOCUMENTS

| | | | |
|---|---|---|---|
| 4,430,772 A * | 2/1984 | Michel et al. .................. 452/32 |
| 5,782,737 A | 7/1998 | Warner | |
| 6,171,228 B1 * | 1/2001 | Marotzke et al. ............. 493/405 |
| 6,248,052 B1 * | 6/2001 | Kleeberger et al. .......... 493/374 |
| 6,260,330 B1 | 7/2001 | Borowski et al. | |
| 6,305,150 B1 * | 10/2001 | Dietsch ........................ 53/529 |
| 6,327,838 B1 * | 12/2001 | Maul et al. .................... 53/429 |
| 6,532,716 B1 * | 3/2003 | Weis ............................ 53/258 |
| 6,536,801 B2 | 3/2003 | Frisch | |

FOREIGN PATENT DOCUMENTS

EP    1155926 A2    11/2001

(Continued)

*Primary Examiner*—Sameh H. Tawfik
(74) *Attorney, Agent, or Firm*—Sughrue Mion, PLLC

(57) ABSTRACT

There are provided an airbag folding device, and an airbag folding method, for mechanically folding an airbag to form a doughnut-shaped airbag. The airbag folding device is characterized in comprising a support member (62) columnar in shape, rising while supporting a tubular tether belt (11*a*), an outer cylinder (63) coaxial with the support member (62), for containing the airbag body (10*a*) on the outside of the support member (62), by rising, a work table (61) having the support member (62), and the outer cylinder (63), and a clamping member (64) positioned straight above the support member (62), for clamping the tubular tether belt (11*a*) between the clamping member (64) and the support member (62), wherein a pair of plates (65) in such a state as to cover an upper end of the outer cylinder (63), and to be fitted to a lower end of the clamping member (64) cause the support member (62), the outer cylinder (63) and the clamping member (64) to concurrently descend.

6 Claims, 12 Drawing Sheets

FOREIGN PATENT DOCUMENTS

| | | |
|---|---|---|
| JP | 11-129847 A | 5/1999 |
| JP | 11-334512 A | 12/1999 |
| JP | 2004-122939 A | 4/2004 |
| WO | 98/04442 A1 | 2/1998 |
| WO | 99-67108 A1 | 12/1999 |
| WO | 00/15467 A1 | 3/2000 |

* cited by examiner

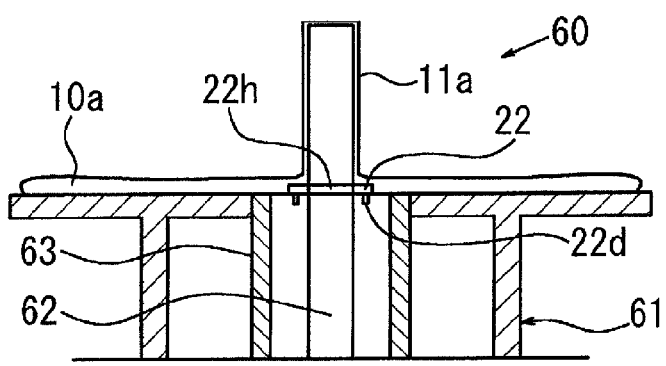
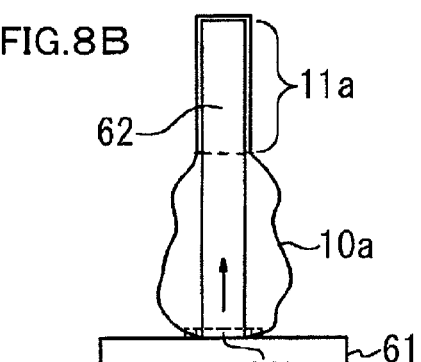
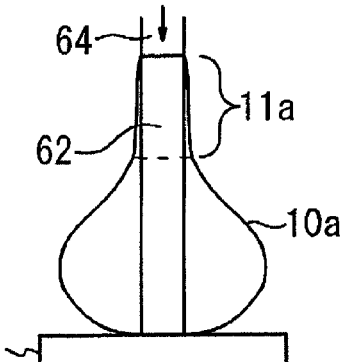
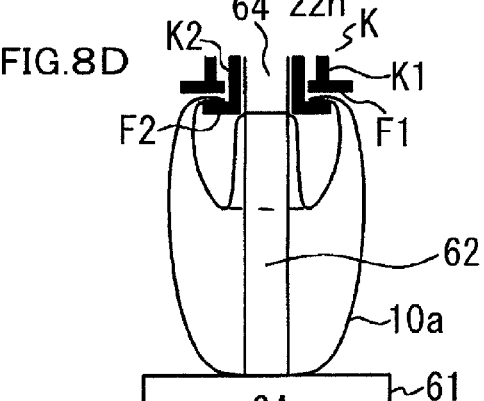
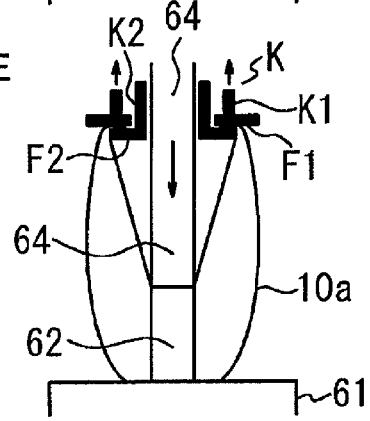
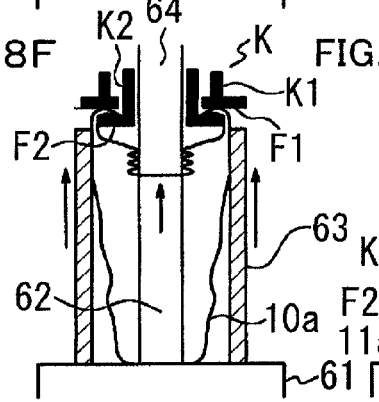
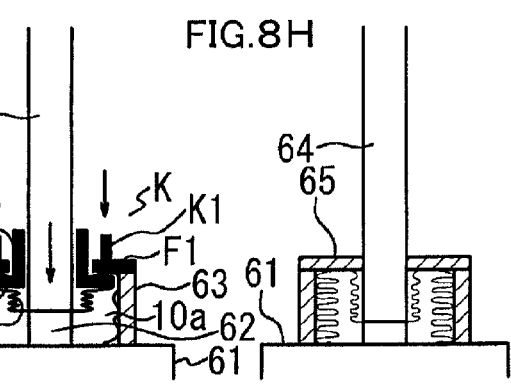

AIRBAG FOLDING DEVICE AND AIRBAG FOLDING METHOD

TECHNICAL FIELD

The invention relates to an airbag folding device and an airbag folding method for mechanically folding an airbag in a desired compact shape for use in an airbag device installed in an automobile, particularly to an airbag folding device and an airbag folding method for folding a doughnut-shaped airbag.

BACKGROUND TECHNOLOGY

There has thus far been known an airbag folding device, as an example of an airbag folding device for mechanically folding an airbag of three pieces type by starting a horizontal folding work upon completion of a vertical folding work of the airbag (see Patent Document 1).

According to the conventional airbag folding device, the airbag has been generally folded by a method comprising a vertical folding step and a horizontal folding step, and a speed of inflation and expansion of the airbag has been generally adjusted by this folding method.

Meanwhile, although the applicant developed an airbag which expands in orderly sequence starting from a region to be first expanded and undergoes inflation and expansion without forming a lump, the folding method is to fold manually like bellows the airbag in the longitudinal direction from the tip portion of the airbag to undergo inflation and expansion toward the rear end portion to be secured to the airbag device. Since a planar shape of the airbag as folded is doughnut-shaped (the airbag as folded is hereinafter referred to as a doughnut-shaped airbag), it is impossible to fold the doughnut-shaped airbag by the airbag folding device which has been conventionally used for folding the airbag by executing a vertical folding step and a horizontal folding step.

However, an airbag folding device for forming a doughnut-shaped airbag by folding like bellows the airbag in the longitudinal direction has not been developed so far.

Patent Document 1: JP 11-129847 A.

DISCLOSURE OF THE INVENTION

Problems to be Solved by the Invention

It is an object of the invention to provide an airbag folding device and an airbag folding method for forming a doughnut-shaped airbag by mechanically folding the airbag in the longitudinal direction from the tip portion of the airbag to undergo inflation and expansion toward the rear end portion to be secured to the airbag device.

Means for Solving the Problems

To achieve the above object, the first aspect of the invention is an airbag folding device for folding like bellows an airbag comprising an airbag body formed of front and back base fabrics to be in the shape of a bag, and a tubular tether belt extending from a central position of the front base fabric toward the interior of the bag in the longitudinal direction thereof, characterized in that the airbag folding device comprises a support member columnar in shape, inserted into the tubular tether belt 11a, and vertically movable, an outer cylinder capable of storing the airbag body disposed on the outside of the support member so as to be coaxial with the support member and vertically movable, a work table provided with the support member and the outer cylinder, a clamping member vertically movable for clamping the tubular tether belt between the clamping member and the support member at a position straight above the support member, and means for folding back the tubular tether belt supported by the support member at one end thereof and securing the other end thereof, whereby the tubular tether belt and the airbag body are folded by causing the support member, the clamping member, and the outer cylinder to vertically move.

The second aspect of the invention is the airbag folding device according to the first aspect characterized in that the support member has an outside diameter smaller than a diameter of an inflator insertion opening of a cushion ring for attachment of the airbag, and bolts of the cushion ring inserted in small holes provided on a peripheral part around an inflator attachment opening of the airbag body, respectively, are engaged with holes provided on the periphery of the support member of the work table, on an upper end face thereof, respectively, thereby causing the airbag body to be supported by the work table.

The third aspect of the invention is the airbag device according to the second aspect characterized in that a tip of the support member is provided with a protruding part while the tubular tether belt is provided with an attachment hole, and the protruding part is inserted through the attachment hole.

The fourth aspect of the invention is an airbag folding method for folding like bellows an airbag comprising an airbag body formed of front and back base fabrics to be in the shape of a bag, and a tubular tether belt extending from a central position of the front base fabric toward the interior of the bag in the longitudinal direction thereof, characterized in that said airbag folding method comprises the step of causing one end of the tubular tether belt and the airbag body in sequence to ascend, the step of causing the raised tubular tether belt to descend by a distance corresponding to a length substantially equal to half a full length thereof, the step of pulling the other end of tubular tether belt upward around one end of the tubular tether belt to thereby fold back the tubular tether belt at a position corresponding to substantially the middle of the full length thereof, and the step of compressing the tubular tether belt as folded back together with the airbag body, from above to be thereby folded.

The fifth aspect of the invention is an airbag folding method for folding like bellows an airbag comprising an airbag body formed of front and back base fabrics to be in the shape of a bag, and a tubular tether belt extending from a central position of the front base fabric toward the interior of the bag in the longitudinal direction thereof, characterized in that said airbag folding method comprises the step of causing one end of the tubular tether belt and the airbag body to ascend in sequence, the step of causing the raised tubular tether belt to descend by a distance corresponding to a length substantially equal to half a full length thereof, the step of pulling the other end of tubular tether belt upward around one end of the tubular tether belt to thereby fold back the tubular tether belt at a position corresponding to substantially the middle of the full length thereof, the step of causing one end of the tubular tether belt to descend to thereby pull one end of the tubular tether belt with securing a position of the other end of tubular tether belt, the step of causing one end of the tubular tether belt to ascend to thereby fold the tubular tether belt, and the step of compressing the airbag body from above to thereby fold the airbag body.

EFFECT OF THE INVENTION

According to the invention, the tubular tether belt overlapping itself together with the airbag body can be folded like bellows while being compressed, and the tubular tether belt is folded in the longitudinal direction of the tube portion thereof in the initial stage where the folded doughnut-shaped airbag starts to be inflated at the time of an impact, so that the doughnut-shaped airbag hardly meets resistance upon extension thereof, and undergoes sequential and orderly expansion starting from a region ought to be first expanded, thereby executing smooth expansion.

With the airbag folding device according to the invention, the doughnut-shaped airbag is formed by compressing the airbag wherein the bolts of the cushion ring inserted into the small holes provided on the peripheral part around the inflator attachment opening of the airbag body, respectively, are engaged with the four holes provided on the outer circumference of the support member of the work table, on the upper end face thereof, so that the formed doughnut-shaped airbag, with the respective bolts of the cushion ring protruding therefrom, can be attached to the airbag cover, resulting enhancement in work efficiency.

Further, with the airbag folding device according to the invention, it is possible to mechanically execute a work whereby the airbag body and the tubular tether belt are concurrently folded like bellows in the longitudinal direction thereof, thereby enabling productivity and cost effectiveness of the doughnut-shaped airbag to be enhanced.

BRIEF DESCRIPTION OF THE DRAWINGS

FIG. 5A is a front elevation of a cushion ring shown in FIG. 2 while

FIG. 6A is a see-through perspective view showing the interior of an inflated doughnut-shaped airbag, while

FIGS. 8A to 8H each are view showing an operation procedure for folding the airbag by an airbag-folding device according to a second embodiment;

FIG. 11A is a perspective view of an airbag cover, while

EXPLANATION OF THE REFERENCE NUMERALS

10a . . . airbag main body, 11a . . . tubular tether belt, 12 . . . protective member, 12' . . . gas rectification member, 14 . . . holding member, 16 . . . airbag cover, 20 . . . connecting member, 22 . . . cushion ring, 24 . . . base plate, 30 . . . inflator

BEST MODE FOR CARRYING OUT THE INVENTION

Figure 1:
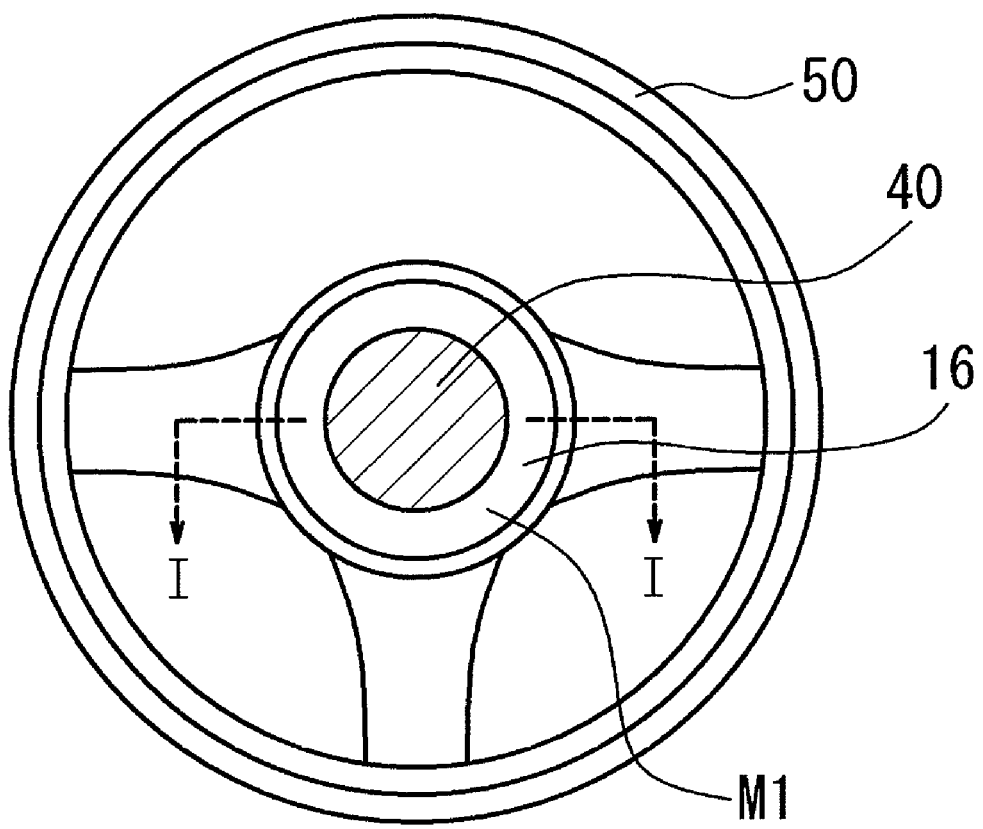
FIG. 1 is a front elevation showing an airbag device fitted to a steering wheel.
Figure 2:
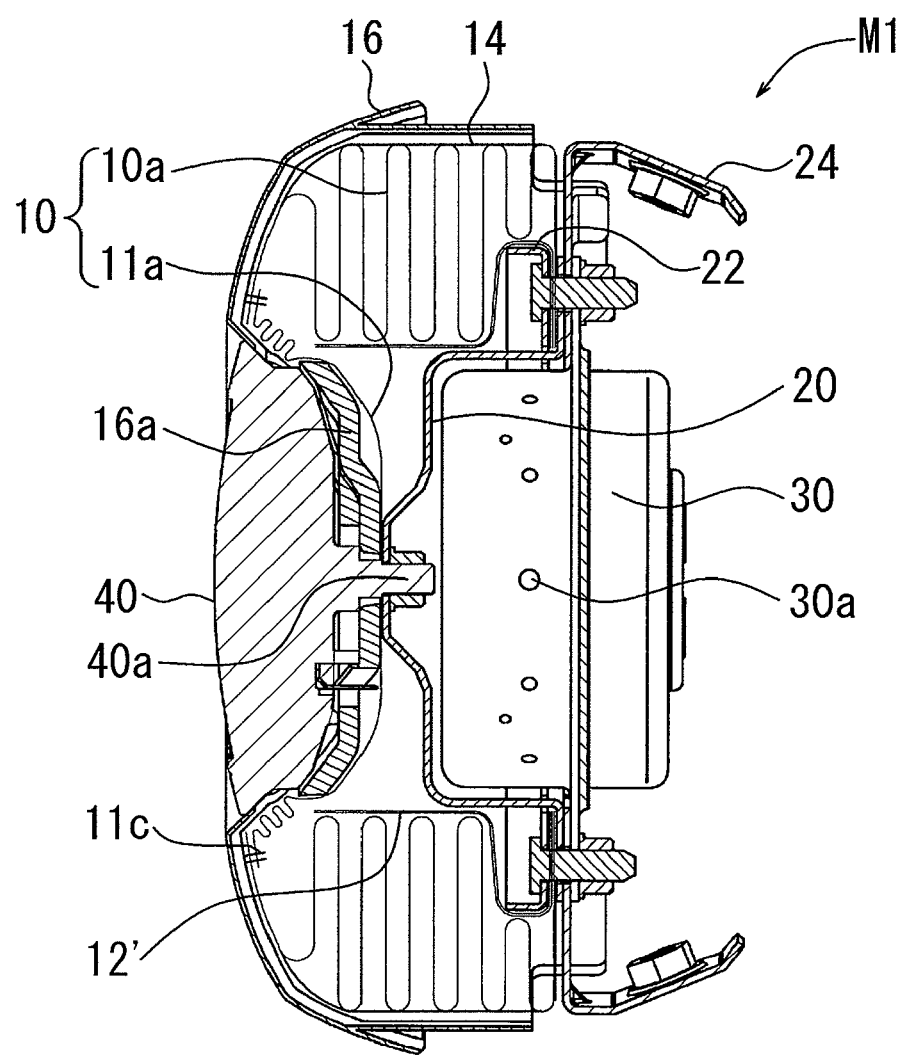
FIG. 2 is a cross-sectional view of the airbag device, taken on arrow I-I of FIG. 1.

There is described hereinafter an airbag device M1 for a driver seat in which a doughnut-shaped airbag folded by an airbag folding device according to the invention is contained, with reference to the accompanying drawings. FIG. 1 is a front elevation showing the airbag device M1 fitted into a steering wheel, and FIG. 2 is a cross-sectional view thereof taken on arrow I-I of FIG. 1. As shown in FIGS. 1, and 2, the airbag device M1 is assembled into the central part of a steering wheel of a vehicle, and comprises a decorative member 40, an airbag 10, and an airbag cover 16. For convenience's sake, a side of an occupant is referred to as a front side, while a side thereof opposite from the front side is referred to as a back side in the present specification.

As shown in FIG. 2, the airbag 10 comprises an airbag main body 10a formed in the shape of a bag by front and back fabrics, and a tubular tether belt 11a for restricting an extension length of the airbag main body 10a, and the airbag 10 folded like bellows is contained within the airbag cover 16.

The doughnut-shaped airbag 10 is covered with a holding member 14 in such a way as to press down a side face of the airbag 10 on the outer circumference thereof to thereby restrain inflation and expansion of the airbag 10 in the direction of the side face thereof. The main body 10a and the holding member 14 are secured to a base plate 24 by a cushion ring 22 inserted into the airbag 10. Further, the airbag cover 16 is secured to the base plate 24 in such a way as to cover up airbag 10 and such.

Meanwhile, an attachment bolt 40a positioned on the back side of a depressed part 16a formed on the airbag cover 16 on the side of the occupant and protruding toward the back side of the decorative member 40 is secured to a connecting member 20 with a nut, thereby clamping an end of the tubular tether belt 11a between those members. Further, respective ends of the connecting member 20 are clamped between the cushion ring 22 and the base plate 24 to be thereby secured to the base plate 24. Further, as described in detail later, reference numeral 12 denotes a protective member, 12' denotes a rectification member, and 11c denotes a stitched part where the tubular tether belt 11a is stitched to the airbag main body 10a.

Now, there are described hereinafter respective structures of the base plate 24, the connecting member 20, and the cushion ring 22.

Figure 3:
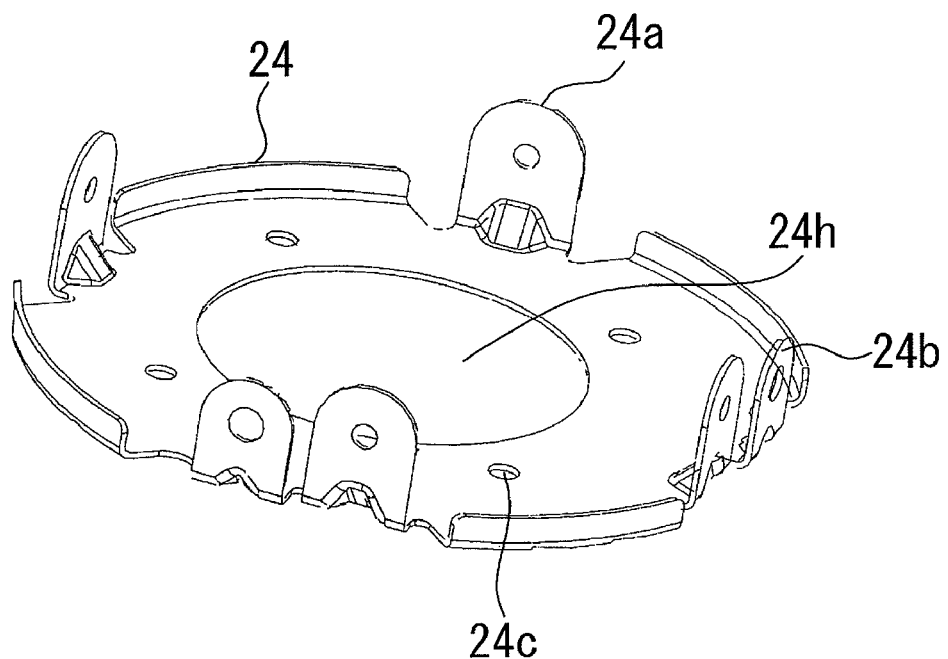
FIG. 3 is a perspective view showing a back side of a base plate.

FIG. 3 is a perspective view showing the back side of the base plate 24 shown in FIG. 2. The base plate 24 is formed substantially in the shape of a disk, and an opening 24h in which an inflator can be fitted is formed at the central part of the base plate 24, while 4 pieces of airbag cover attachment pieces 24a and a pair of attachment pieces 24b for attachment of the base plate 24 itself are formed in such a way as to be erected from the disk. The base plate 24 is for integrally securing the inflator 30, the doughnut-shaped airbag 10, and the decorative member 40 previously described with each other, and the pair of the attachment pieces 24b are for securing the base plate 24 to the steering wheel.

The inflator 30 is formed substantially in the shape of a thick disk and is made up so as to exhaust gas upon detection over a predetermined impact. The inflator 30 has an upper portion with a gas exhaust port 30a formed therein, penetrating through the opening 24h of the base plate 24 and a flange formed substantially in an intermediate part of inflator 30 in the direction of thickness thereof, in close contact with the back side of the base plate 24, thereby being secured, together with the cushion ring 22, to the base plate 24 through the attachment holes 24c of the base plate 24. That is, the inflator 30 is secured to the base plate 24 with the gas exhaust port 30a of the inflator 30 disposed on the front side of the base plate 24, so that an exhaust gas from the inflator 30 is exhausted on the front side of the base plate 24.

Figure 4:
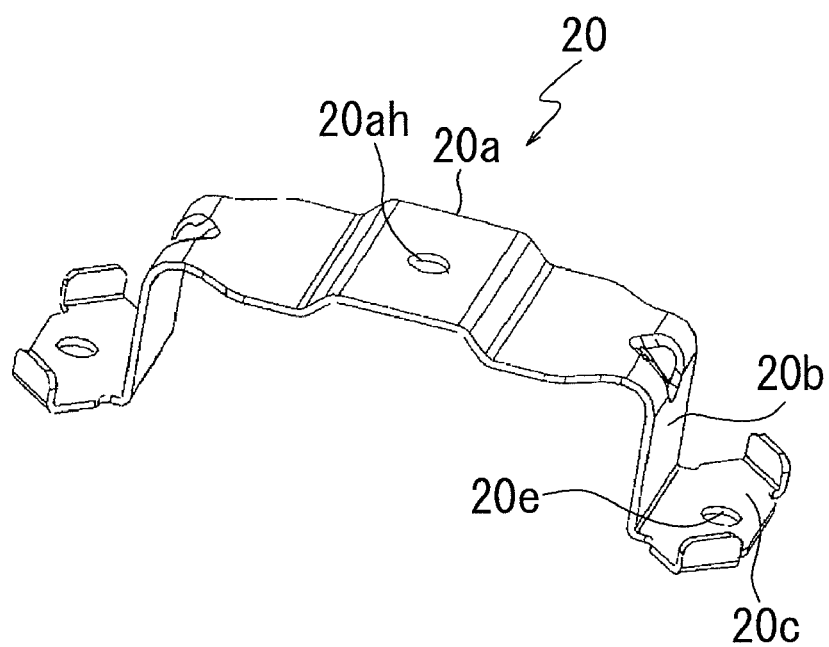
FIG. 4 is a perspective view of a connecting member.

FIG. 4 is a perspective view of the connecting member 20 shown in FIG. 2. The connecting member 20 is made of a metal piece in a sheet-like shape, comprising a central part 20a provided with a hole 20ah in which the attachment bolt 40a is fitted, a leg part 20b formed on each of both sides of the central part 20a bent substantially vertical therefrom, and attachment feet 20c bent substantially right angle to the respective leg parts 20b. Further, each attachment foot 20c is provided with an attachment hole 20e made so as to correspond to the attachment holes 22a of the cushion ring 22, and the attachment holes 24c of the base plate 24, so that both connecting member 20 and the base plate 24 are tightened up each other with bolts 22d formed on the cushion ring 22.

Figure 5A:
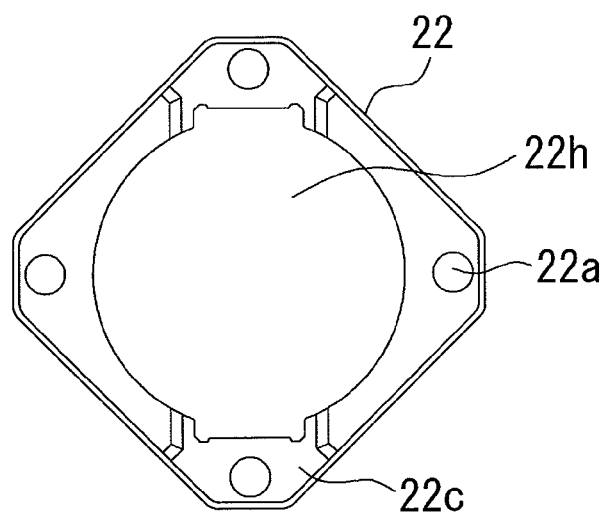
Figure 5B:
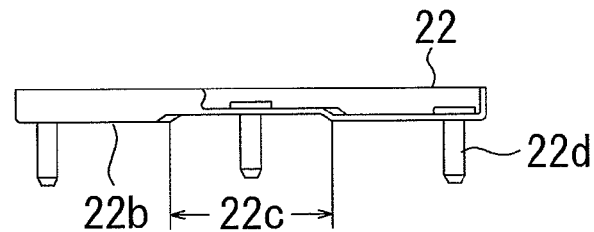
FIG. 5B is a side view showing a part thereof, in section.

FIG. 5A is a front elevation of the cushion ring 22 shown in FIG. 2 and FIG. 5B is a side view showing a part thereof, in section. As shown in FIG. 5A, the cushion ring 22 is substantially in the shape of a rectangle, a central part thereof is provided with an insertion opening 22h for the inflator 30, and the bolt 22d for attaching the cushion ring 22 to the base plate 24 is provided in respective corners of the cushion ring 22 around the insertion opening 22h on the back side of the cushion ring 22. Further, the back side of the cushion ring 22 constitutes a butting surface 22b that can be butted against the surface of the base plate 24 through the airbag 10 interposed therebetween, the butting surface 22b has a depressed part 22c formed by, for example, drawing work, as is evident from the side view of FIG. 5B. The depressed part 22c is formed so as to have a draw depth substantially equal to a thickness of the attachment foot 20c of the connecting member 20 when the cushion ring 22 is connected with the connecting member 20.

Now, the airbag 10 is described hereinafter with reference to FIGS. 6A, and 6B.

Figure 6A:
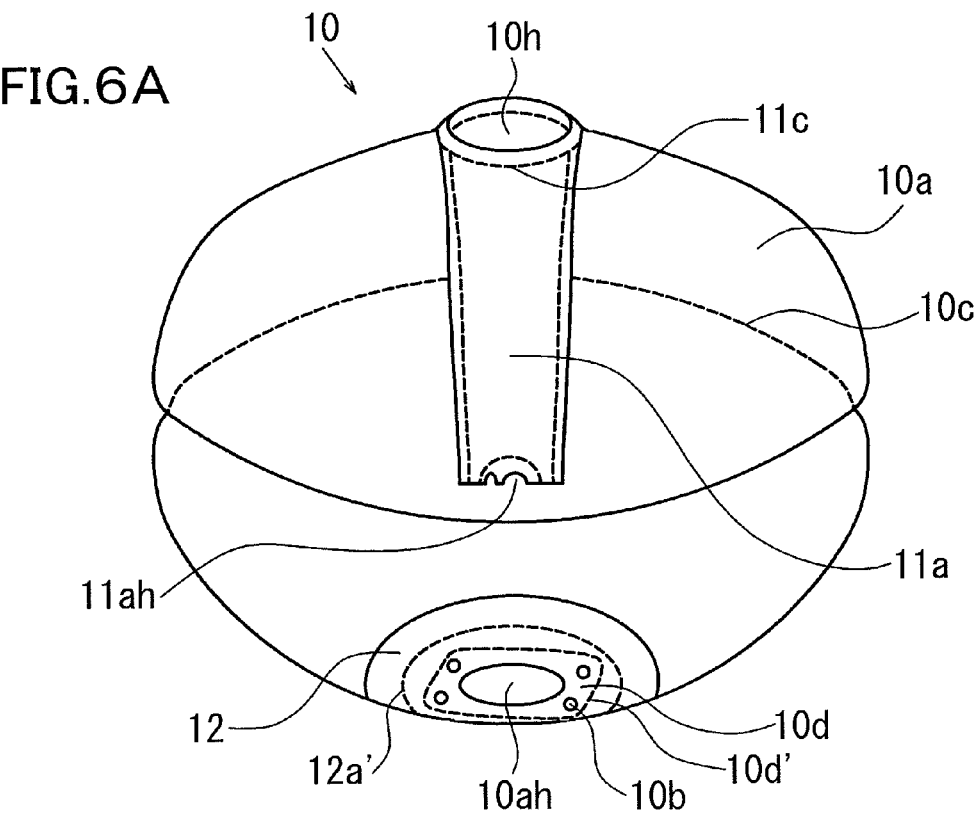
Figure 6B:
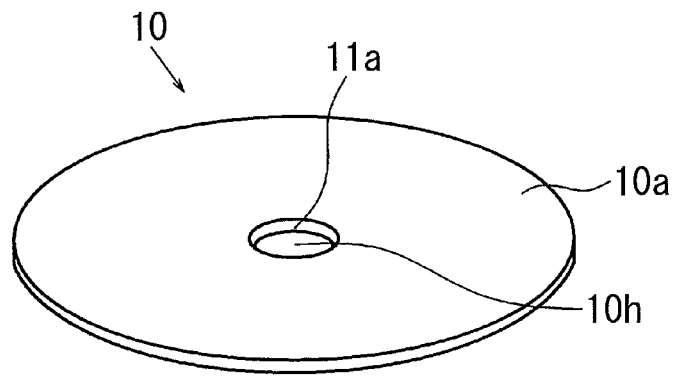
FIG. 6B is a perspective view showing the uninflated doughnut-shaped airbag.

FIG. 6A is a see-through perspective view showing the interior of the inflated airbag 10, and FIG. 6B is a perspective view showing the un-inflated airbag 10. For brevity, the decorative member 40 disposed inside the tubular tether belt 11a, the inflator 30 joined with the decorative member 40 and so forth are not shown in those figures. The airbag main body 10a is formed in the shape of a bag that is expandable into a flat spherical shape (an ellipsoidal shape) by joining respective outer circumferential edges of two pieces of cloth substantially circular in shape with each other by stitching. A notched part 10h of circular shape for insertion of the depressed part 16a of the airbag cover 16 is formed substantially at the central part of the airbag main body 10a on the front side thereof, and an inflator attachment opening 10ah associating with the inflator for introducing an generated gas into the airbag is formed substantially at the central part of the airbag main body 10a on the back side thereof, while four small holes 10b for insertion of the respective bolts 22d (see FIG. 5B) of the cushion ring 22 are made on the peripheral part 10d around the inflator attachment opening 10ah.

The protective member 12 for protecting the airbag from heat and an impactive pressure generated by the inflator is overlaid on the peripheral part 10d and stitched to a peripheral edge of the inflator attachment opening 10ah of the airbag 10. In the airbag device M1, the protective member 12 is also used as a gas rectification member having a function for guiding the gas up to the vicinity of a part of the airbag (a part of the airbag expanding from an anticipated rupture part of the holding member 14 of circular shape (see FIG. 9A, described later)), that will be inflated in the initial expansion thereof, by rectifying a gas flow direction.

As shown in FIG. 6A, the protective member 12 is made of, for example, a woven cloth and is circularly formed having a hole at the center thereof, and a diameter of the hole is identical to that of the inflator attachment opening 10ah, while an outer circumference thereof is, for example, at least three times as large in diameter as the hole. When attaching the protective member 12 to the inflator attachment opening 10ah, a periphery of the hole of the protective member 12 is aligned with that of the inflator attachment opening 10ah before the protective member 12 is stitched to an outer circumferential part 10d' of the peripheral part 10d and an outer circumferential part 12a' of a concentric circle of the peripheral part 10d.

The protective member 12 has the function as the protective member for protecting the airbag from heat and impact of gas pressure as well as the function as the rectification member for rectifying gas after the airbag 10 is folded and contained. Further, one sheet of the protective member 12 is effective, however, two or more sheets thereof may be adopted, and for the gas rectification member, and may be used for the gas rectification member.

The airbag 10 comprises the airbag main body 10a and the tubular tether belt 11a for restricting the extension length of the airbag main body 10a, and the airbag main body 10a is provided with a stitched part 10c formed by stitching respective outer peripheral edges of two pieces of base fabrics (a base fabric of the surface portion of the airbag main body and a base fabric of the rear surface portion thereof) substantially circular in shape with each other, and an airbag after stitched is turned inside out, thereby forming the airbag main body in the shape of the bag expandable into the flat spherical shape (the ellipsoidal shape). The attachment hole 11ah is formed for inserting the attachment bolt 40a, at the end of the tubular tether belt 11a.

As is evident from FIG. 6B, the two pieces of the base fabrics substantially circular in shape are substantially identical in size to each other. The airbag 10 after stretched substantially to a full length in the direction of extension of the airbag shown in FIG. 6A (upward in the figure), is folded like bellows with vertically compressed to be contained in the airbag cover 16. At the same time, not only the airbag main body 10a but also the tubular tether belt 11a is folded like bellows in the direction of a tube length thereof.

The tubular tether belt 11a when stretched substantially to the full length thereof has a length substantially equal to a length of the front and back base fabric of the airbag main body 10a respectively.

Now, there is described hereinafter a device of folding like bellows with vertically compressed the airbag 10 stretched substantially to the full length thereof in the direction of the extension of the airbag as shown in FIG. 6A (upward in the figure). For folding like bellows the airbag 10, an airbag folding device 60 according to the embodiment of the invention may be used.

FIGS. 7A to 7H each are views showing operating process for folding the airbag with the airbag folding device according to the first embodiment. The operating process for folding the airbag will be described hereinafter with reference to those views.

Figure 7A:
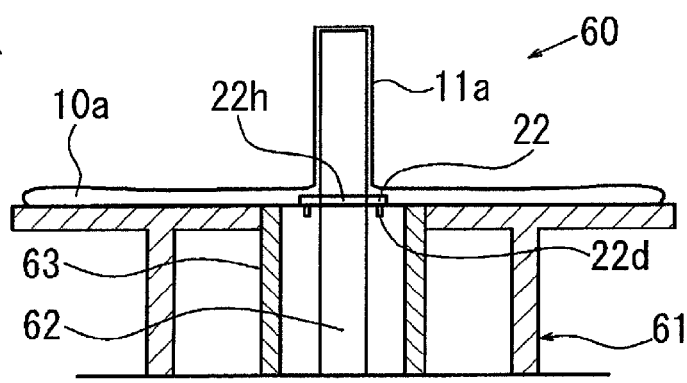
FIGS. 7A to 7H each are view showing an operation procedure for folding the airbag by an airbag-folding device according to a first embodiment.

As shown in FIG. 7A, the airbag folding device 60 comprises a work table 61 having a support member 62 columnar in shape for supporting the tubular tether belt 11a and an outer cylinder 63 coaxial with the support member 62 for containing the airbag 10 on the outside of the support member 62, and a support unit (not shown) for supporting a clamping member 64 columnar in shape (see FIG. 7C), positioned vertically above the support member 62 and substantially identical in outer diameter thereto, to thereby clamp the upper end of the tubular tether belt 11a between a clamping member 64 and the support member 62. Since the outer diameter of the support member 62 is smaller than the diameter of the inflator insertion opening 22h of the cushion ring 22, the support member 62 can be inserted through the insertion opening 22h by a driving unit, not shown, to thereby ascend as described later.

Further, as shown in FIG. 7A, the bolts 22d of the cushion ring 22 are inserted into the four small holes 10b provided on the peripheral part 10d (see FIG. 6A) around the inflator attachment opening 10ah of the airbag body 10a, respectively. The bolts 22d are engaged with four holes provided on the periphery of the support member 62 of the work table 61 on the upper end thereof to be secured to the four holes. The head of the support member 62 is inserted through the insertion opening 22h to thereby be ascended and inserted into a tube portion of the tubular tether belt 11a, and the airbag main body 10a is placed flat on the top of the work table 61 outside of the ascended support member 62.

Figure 7B:
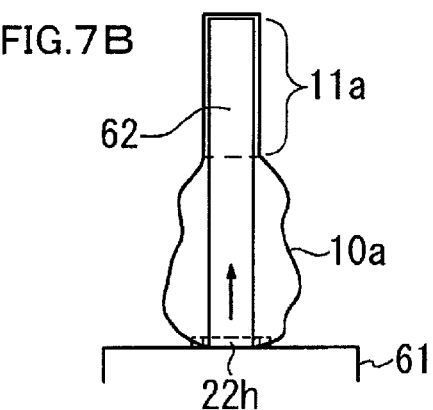

When a lower end of the tubular tether belt 11a (a part having the tubular tether belt 11ah in FIG. 6A) is pushed up with the head of the support member 62 inserted into the tube portion of the tubular tether belt 11a through the insertion opening 22h of the cushion ring 22 as shown in FIG. 7A, the airbag main body 10a is also pushed up as shown in FIG. 7B.

Since the length of the tubular tether belt 11a is substantially equal to half the length of the airbag main body 10a, the support member 62 ascends to a position at a height at the maximum about three times of the length of the tubular tether belt 11a and stops at the position, whereupon the tubular tether belt is manually passed through a protrusion provided at the tip of the support member 62 through the attachment hole 11ah, thereby implementing positioning of the tubular tether belt 11a.

Figure 7C:
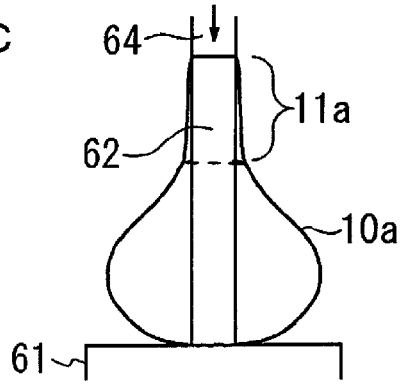
Figure 7D:
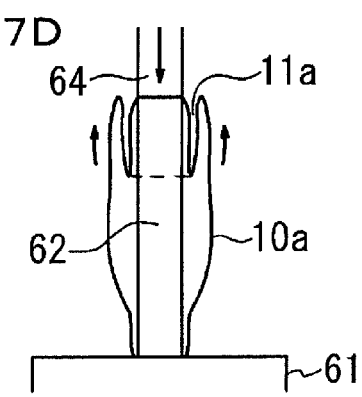

As shown in FIG. 7C, the clamping member 64 descends, by a driving unit, not shown, to clamp said positioned tubular tether belt 11a between the support member 62 and the clamping member 64. As shown in FIG. 7D, upon the support member 62 and the clamping member 64 descending to a position corresponding to half the length of the tubular tether belt 11a, descending operation is stopped, then the airbag main body 10a is manually pulled up around the tubular tether belt 11a as shown in FIG. 7D, thereby the tubular tether belt 11a is folded in two substantially at an intermediate position thereof.

Figure 7E:
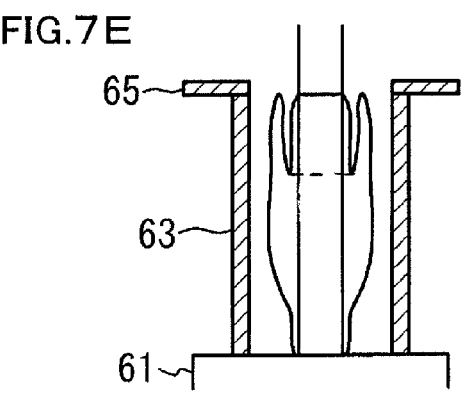
Figure 7F:
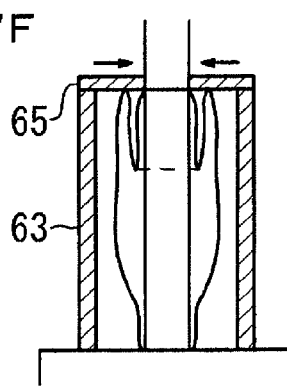

As shown in FIG. 7E, the outer cylinder 63 ascends by the driving unit, not shown, from the work table 61 up to a clamping position of the upper end of the tubular tether belt 11a, thereby containing the airbag 10 between the outer cylinder 63 and the support member 62. As shown in FIG. 7F, with the outer cylinder 63 at that position, a pair of plates 65, each having a hole bilaterally symmetric and semi-circular in shape, are caused to slide by the driving unit, not shown, on an upper end of the outer cylinder 63 from the right side and the left side thereof respectively, to be fitted into a fitting groove (not shown) provided at a lower end of the clamping member 64.

Figure 7G:
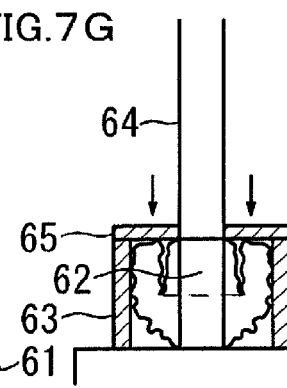
Figure 7H:
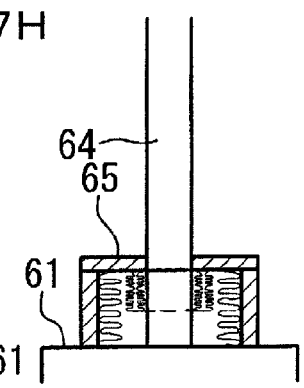

Then, as shown in FIG. 7G, the support member 62, the clamping member 64 and the outer cylinder 63 in keeping that position are caused to concurrently descend, whereupon the folded tubular tether belt 11a overlaid together with the airbag main body 10a will be folded like bellows while being compressed. Upon completion of compression of the airbag 10 (see FIG. 7H), the plates 65 are removed, and subsequently the support member 62, the clamping member 64 and the outer cylinder 63 concurrently revert to respective original positions, thereby completing the operation for folding the doughnut-shaped airbag 10.

FIGS. 8A to 8G each is a view showing respective steps of an airbag folding according to a second embodiment of the invention, using the same airbag folding device as that according to the first embodiment. The respective steps shown in FIGS. 8A up to 8C among those steps of the procedure for folding the airbag 10, according to the second embodiment, are the same as the respective steps of the airbag folding procedure according to the first embodiment, shown in FIGS. 7A to 7C, omitting therefore description thereof.

With the second embodiment, as shown in FIG. 8C, the clamping member 64 is caused to descend with the tubular tether belt 11a positioned as previously described, kept in a clamped state between the support member 62 and the clamping member 64, and as shown in FIG. 8D, the airbag body 10a (to be more exact, a part thereof, in the vicinity of the bonded part between the airbag body 10a and the tubular tether belt 11a) is pulled up around the tubular tether belt 11a to thereby fold the tubular tether belt 11a in two, whereupon a tip thereof is clamped by a clamp K comprising, for example, a hollow column K1 fitted onto the clamping member 64 with a flange F1 provided at a lower end thereof, and an annular member K2 fitted onto the hollow column K1 with a flange F2 attached thereto, more specifically, the tip being clamped between the flanges F1 and F2.

Subsequently, as shown in FIG. 8E, the clamp K is pulled up, and simultaneously, the support member 62, and the clamping member 64 are lowered with the airbag body 10a kept in a clamped state therebetween, so that the tubular tether belt 11a is pulled between the clamp K, and the support member 62 together with the clamping member 64, thereby causing tension to act on the tubular tether belt 11a.

Subsequently, as shown in FIG. 8F, while the outer cylinder 63 is caused to ascend from the work table 61 to a position where the upper end of the tubular tether belt 11a is clamped, that is, a position of the clamp K, the support member 62, and the clamping member 64 are caused to ascend with the airbag body 10a kept in a clamped state therebetween, thereby folding the tubular tether belt 11a.

As shown in FIG. 8G, the support member 62, the clamping member 64, and the outer cylinder 63 are concurrently caused to descend with the tubular tether belt 11a in a folded state. By so doing, the airbag body 10a is folded like bellows while being compressed. After descent of the clamping member 64 and the outer cylinder 63 is completed, in other words, after the airbag body 10a is fully folded, the clamp K is disengaged. Thereafter, the support member 62, the clamping member 64 and the outer cylinder 63 are put back to respective original positions, thereby obtaining the folded doughnut-shaped airbag 10.

The doughnut-shaped airbag 10 is easier to be folded if folded in this way as compared with the case where the tubular tether belt 11a is bent in the middle so as to be doubled, as in the case of the first embodiment, thereby enabling the doughnut-shaped airbag 10 to be expanded smoother at the time of inflation.

Meanwhile, the length of the airbag 10 has been described in the foregoing as the length of the tubular tether belt 11a is substantially equal to half the length of the airbag main body 10a when the airbag 10 is stretched to the full length thereof, however, it is to be pointed out that the invention is not limited to the length described, and that the respective positions where the support member 62 and the clamping member 64 stop after descending as well as the position where the support member 62 stops may be decided depending on a length of the airbag body 10a.

Figure 9A:
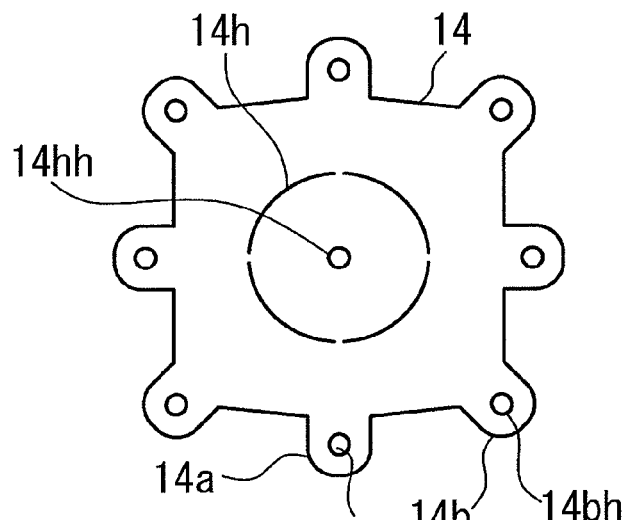
FIG. 9A is an expansion view of a holding member prior to covering the doughnut-shaped airbag.

FIG. 9A is an expansion view of the holding member 14 prior to covering the doughnut-shaped airbag 10. The holding member 14 in the shape of an approximate square is made of a woven cloth, and an attachment bolt insertion hole 14hh circular in shape is provided at the center thereof while eight holes 14ah, 14bh, to be engaged with the bolts 22d of the cushion ring 22 respectively, are provided at the respective centers of four sides of the approximate square, and at respective corners of the approximate square along respective diagonal lines thereof respectively. As described later in the present specification, the attachment bolt insertion hole 14hh of the holding member 14 is a hole for use in insertion of the attachment bolt 40a shown in FIG. 2 when containing the doughnut-shaped airbag 10 covered with the holding member 14 in the airbag cover 16. Reference numeral 14h denotes the anticipated rupture part of the holding member 14, substantially circular in shape, formed by perforations, and the anticipated rupture part 14h is provided in order to facilitate rupture in the initial stage of expansion of the airbag, a size of the anticipated rupture part 14h being sufficient to allow respective diameters of the depressed part 16a of the airbag cover 16 and the decorative member 40 to pass therethrough.

Figure 9B:
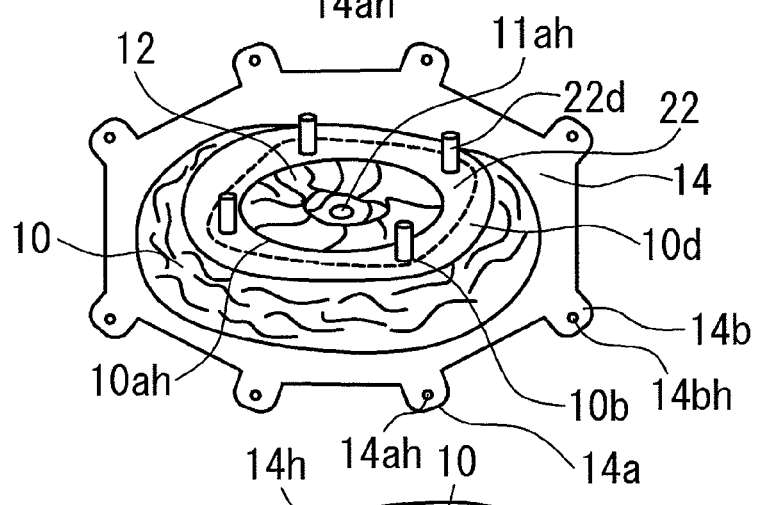
FIG. 9B is a perspective view showing the back side of the doughnut-shaped airbag as folded.

FIG. 9B is a perspective view showing the back side of the holding member 14 prior to covering the doughnut-shaped airbag 10 and the back side of the airbag 10 as folded by the airbag folding device 60 previously described. The four pieces of the holes 14ah of the doughnut-shaped airbag 10 are engaged with the bolts 22d of the cushion ring 22 protruding from the airbag 10 as folded respectively. Thereafter, the holes 14bh positioned on the respective diagonal lines are all engaged with two bolts 22d positioned opposite to each other.

Figure 9C:
FIG. 9C is a perspective view showing the doughnut-shaped airbag covered with the holding member.

FIG. 9C is a perspective view showing the folded doughnut-shaped airbag 10 covered with the holding member 14. When covering the doughnut-shaped airbag 10 by the holding member 14, the doughnut-shaped airbag 10 is covered by the holding member 14 with the attachment hole 11ah of the tubular tether belt 11a shown in FIG. 6A, to overlie the attachment bolt insertion hole 14hh of the holding member 14.

Figure 9D:
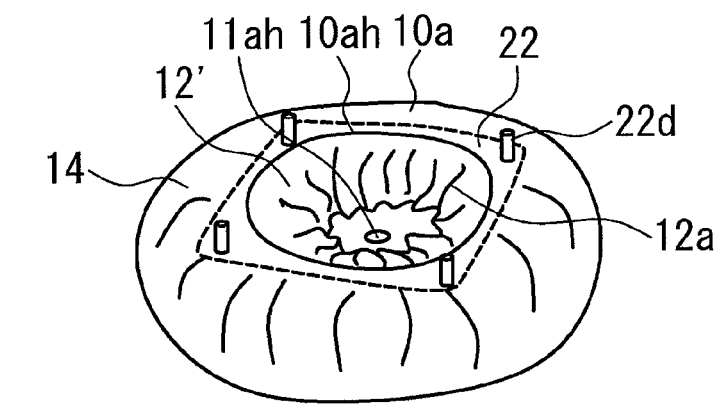
FIG. 9D is a backside view of the doughnut-shaped airbag covered with the holding member.

FIG. 9D is a backside view of the doughnut-shaped airbag 10 covered with the holding member 14. As the protective member 12 is folded like bellows inside the doughnut-shaped airbag 10, the same is pulled out to be thereby disposed along the inner periphery of the doughnut-shaped airbag 10 folded as shown in FIG. 9D (or FIG. 2). By so doing, the protective member 12 carries out the function as the gas rectification member. A part of the protective member 12, which is once pulled out to be thereby disposed along the inner periphery of the folded doughnut-shaped airbag 10 shown in FIG. 9D (or FIG. 2) is hereinafter referred to as a gas rectification member 12'. Further, by covering the airbag 10 with the holding member 14, the attachment hole 11ah of the tubular tether belt 11a overlying the attachment bolt insertion hole 14hh is disposed substantially at the center of the inflator attachment opening 10ah of the airbag 10, in other words, substantially at the center of the gas rectification member 12' which is formed to reach the vicinity of the part of the airbag inflating in the initial expansion thereof. The gas rectification member 12' is attached to the foregoing inflator attachment opening 10ah when held by the holding member 14 as shown in FIG. 9D, and has a surface with multiple-folded pleats 12a formed thereon.

Meanwhile, with the doughnut-shaped airbag 10 held by the holding member 14, and contained in the airbag cover 16, the gas rectification member 12' is extended along the inner wall of the doughnut-shaped airbag 10 toward the front side from the cushion ring 22 clamping the inflator attachment opening 10ah of the doughnut-shaped airbag 10 up to the vicinity of the tip of the folded tubular tether belt 11a, the part of the airbag that will inflate in the initial expansion thereof, as shown in FIG. 2. The gas rectification member 12' in this state is tubular in shape. Since the multiple-folded pleats 12a are formed on the surface of the gas rectification member 12' to thereby have great effect as the protective member for protecting the periphery of the inflator attachment opening 10ah of the doughnut-shaped airbag 10 from heat and impact of gas pressure and also have a function as the rectification member for rectifying the gas since the protective member 12 is tubular in shape.

The bolts 22d of the cushion ring 22 inserted when folding the doughnut-shaped airbag 10 are shown as the peripheral edge of the inflator attachment part, on the backside of the doughnut-shaped airbag 10. As a result of covering the doughnut-shaped airbag 10 with the holding member 14, a side face of the doughnut-shaped airbag 10, on the outer circumference thereof, is pressed down, so that it is possible to restrain the inflation and expansion of the doughnut-shaped airbag 10 in the direction of the side face thereof, caused by the gas generated from the inflator in the initial expansion of the doughnut-shaped airbag 10.

Figure 10:
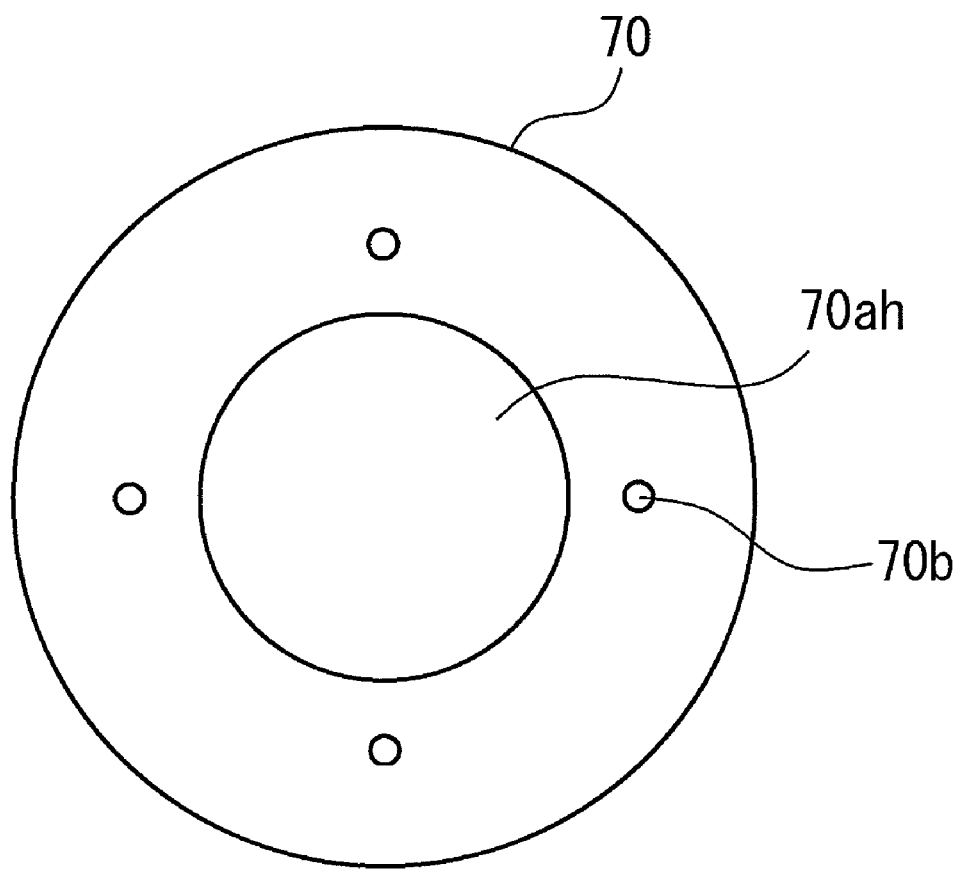
FIG. 10 is an expansion view of a periphery-protective member for protecting a peripheral part provided around an inflator attachment opening.

FIG. 10 is an expansion view of a periphery-protective member 70 for protecting the peripheral part 10d provided around the inflator attachment opening 10ah. The periphery-protective member 70 is made of a woven cloth, and a surface thereof is coated with a silicone rubber. The periphery-protective member 70 is substantially circular in shape, an insertion opening 70ah for use in insertion of the inflator 30 is provided in a central region thereof, and four holes 70b through which the bolts described as above are inserted respectively, are provided along a circumference outside the insertion opening 70ah. The periphery-protective member 70 is provided in order to prevent the peripheral part 10d of the inflator attachment opening 10ah from being damaged by an edge of the connecting member 20 when the connecting member 20 is fitted on the reverse side of the cushion ring 22, and the airbag 10 is clamped between both the members 20, 22 to be thereby secured.

In describing a process for covering the doughnut-shaped airbag 10 with the holding member 14, shown in FIG. 9B, description of the periphery-protective member 70 is omitted, however, prior to engagement of the bolts 22d with the holes 14ah positioned at the respective centers of the four sides, to be engaged with the bolts 22d respectively, the holes 70b of the periphery-protective member 70 are fitted onto the bolts 22d before placement of the periphery-protective member 70, and subsequently, the doughnut-shaped airbag 10 is covered with the holding member 14.

If the protective member 12 is made of a woven cloth as in the case of the airbag 10, it need only be sufficient to dispose cylindrically the protective member 12 prepared by overlaying cloth of a predetermined width on the peripheral part 10d around the inflator attachment opening 10ah to be thereby stitched therewith. The protective member 12 needs to have a length reaching the vicinity of the part of the airbag 10 that will inflate in the initial expansion thereof, preferably a length reaching, for example, the tip of the folded tubular tether belt 11a.

For a material of the protective member 12, material other than a material of the airbag 10, for example, a synthetic resin sheet, and any flexible material capable of carrying out the function for rectifying gas can be used. In such a case, it need only be sufficient to securely attach to the airbag 10 and the synthetic resin sheet together by appropriate means. Further, it is also possible to carry out the invention with the protective member 12 made as a separate member without securely attaching to the doughnut-shaped airbag 10. If the protective member 12 is the separate member, the protective member 12 is not limited to the synthetic resin sheet, and may be one made of metal. In such a case, it need only be sufficient to rectify the gas generated from the inflator to flow only toward the part of the airbag that will inflate in the initial expansion thereof. The protective member 12 may be either integrally joined with the bolts 22d of the cushion ring 22, or may be attached as a member completely separated therefrom. Otherwise, the protective member 12 may be welded to the base plate 24, or may be formed by deep drawing.

Subsequent assembling work for the airbag device M1 is the same as the work described in the foregoing. As previously described, the protective member 12 needs to have the length reaching the vicinity of the part of the airbag 10 that will inflate in the initial expansion thereof, preferably the length reaching, for example, the tip of the folded tubular tether belt 11a.

Figure 11A:
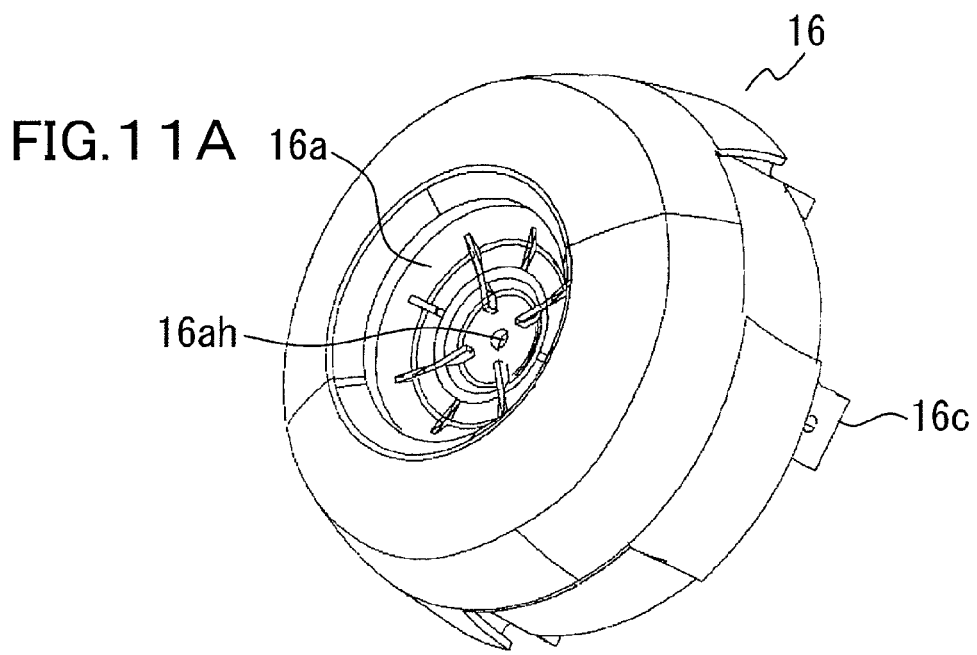

FIG. 11A is a perspective view of the airbag cover 16. The airbag cover 16 is formed of a synthetic resin so as to be substantially in a bowl-like shape, and the depressed part 16a for accommodating the decorative member 40 is provided at the central part of the airbag cover 16, as previously described.

The airbag cover 16 is secured to the base plate 24 with rivets through the airbag cover attachment pieces 24a as the intermediary. Further, with the decorative member 40 attached to the depressed part 16a of the airbag cover 16, a surface of the decorative member 40 is substantially flush with a surface of the airbag cover 16, as shown in FIG. 2.

Figure 11B:
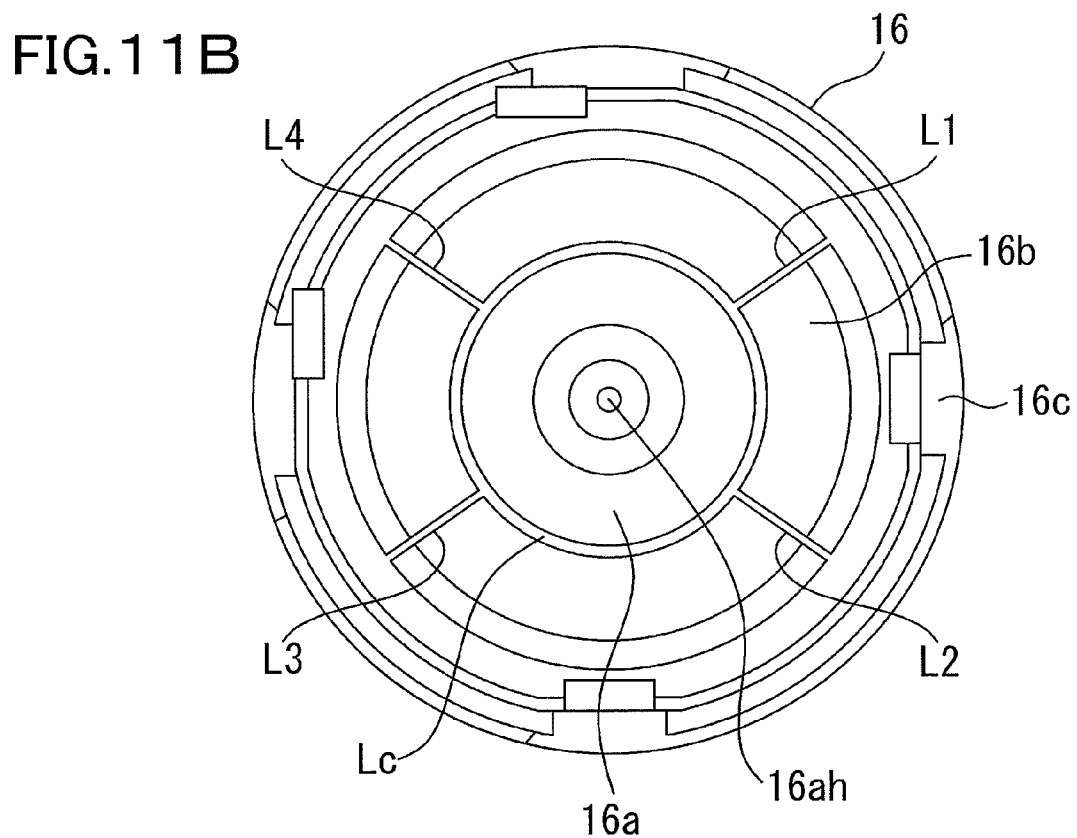
FIG. 11B is a backside view of the airbag cover.

FIG. 11B is a back side view of the airbag cover 16. As shown in the figure, tear-lines (L1 to L4, Lc) in a groove-like shape, capable of splitting and tearing upon the inflation and expansion of the doughnut-shaped airbag 10, while leaving out the depressed part 16a at the center secured by the connecting member 20, are formed on the back side of the airbag cover 16. More specifically, the back side of the airbag cover 16 is provided with a series of the tear-lines comprising the tear-line Lc circular in shape, formed around the depressed part 16a, and a plurality of the tear-lines, for example, four pieces of the tear-lines L1 to L4, radially extended from the tear-line Lc, so as to enable the airbag cover 16 to be split into a plurality of cover pieces 16b with the depressed part 16a left out as it is, upon the airbag cover 16 being subjected to an inflation pressure of the airbag. Further, the airbag cover 16 is secured to the base plate 24 with the rivets such that the airbag cover 16 can be split into the respective cover pieces 16b upon the inflation of the doughnut-shaped airbag 10, and the respective cover pieces 16b can independently open up.

With the above structure, when the inflator 30 is actuated and the doughnut-shaped airbag 10 undergoes inflation and expansion by a gas pressure, the airbag cover 16 is pressed to be split along the respective tear-lines L around the decorative member 40 by a force of the inflation and expansion, whereupon the split cover pieces will open outward respectively, with the depressed part 16a in the bowl-like shape at the center being left out as it is, to be then completely cut apart and independently open up respectively, as described above.

Figure 12:
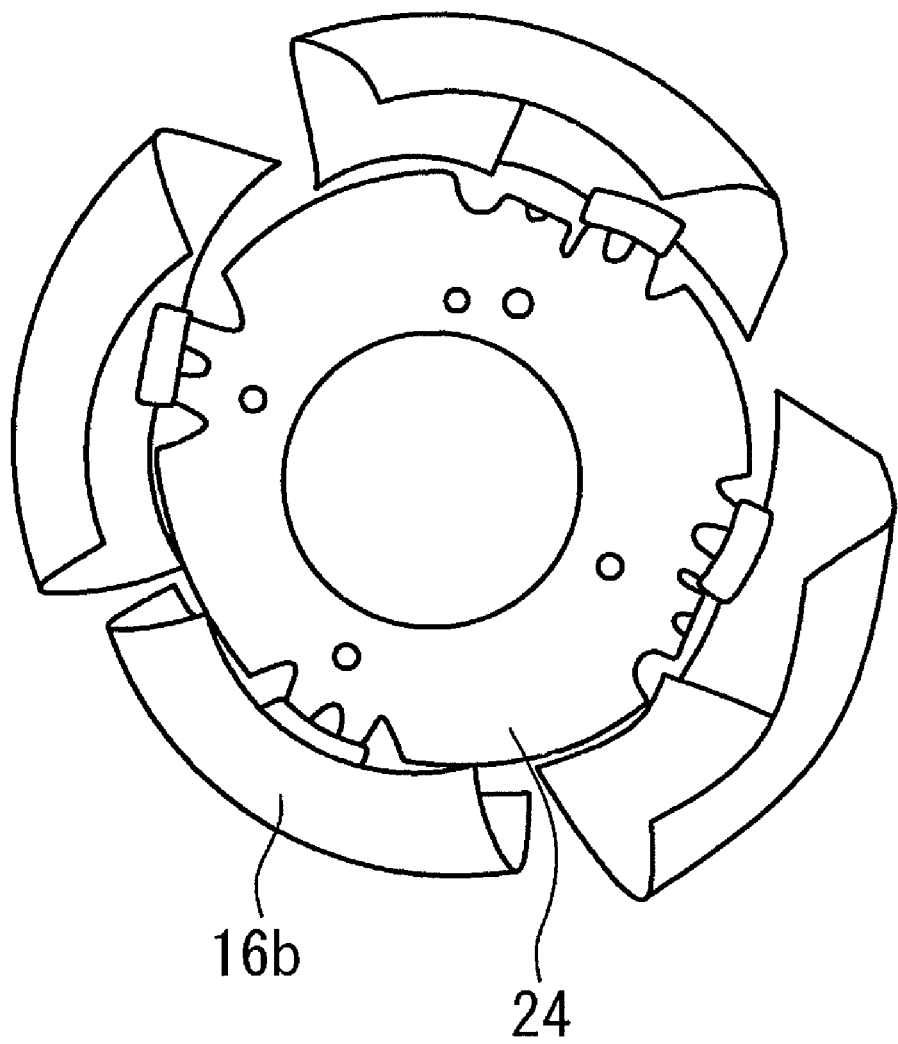
FIG. 12 is a view showing respective cover pieces in as opened-up state, as seen from an occupant side.

FIG. 12 is a view showing the respective opened-up cover pieces 16b, as seen from an occupant side. As shown in the figure, because the airbag cover 16 is split into the respective cover pieces 16b upon the expansion of the doughnut-shaped airbag 10, the airbag cover 16 will not interfere with the expansion of the airbag 10 in the direction of the side face thereof, after the doughnut-shaped airbag 10 passes through the anticipated rupture part 14h of the holding member 14. For brevity, the airbag and so forth are not shown in the figure.

Herein, there is described a process for assembling the airbag device M1 with reference to FIGS. 3 to 5, and FIGS. 9 and 11.

On assembling, the doughnut-shaped airbag 10 with the cushion ring 22 pre-contained therein and packaged in the holding member 14 is contained in the airbag cover 16 by aligning the position of a hole 16ah of the airbag cover 16 with that of the tubular tether belt attachment hole 11ah of the doughnut-shaped airbag 10. Then, while the connecting member 20 is inserted into the doughnut-shaped airbag 10 such that a position of the hole 20ah of the central part of the connecting member 20 is aligned with that of the tubular tether belt attachment hole 11ah, the bolt 22d protruding from the depressed part 22c of the cushion ring 22 into the doughnut-shaped airbag 10, as shown in FIG. 9D, is inserted into the attachment hole 20e of the connecting member 20, thereby fitting the attachment foot 20c into the depressed part 22c.

By inserting the attachment bolt 40a of the decorative member 40 into the hole 16ah of the depressed part 16a of the airbag cover 16 from the front side, it is possible to insert the attachment bolt 40a into the hole 16ah of the airbag cover 16, the attachment hole 11ah of the tubular tether belt 11a of the airbag 10 and the hole 20ah of the central part of the connecting member 20 disposed in alignment with the hole 16ah respectively. By screwing down a nut against the attachment bolt 40a, the attachment bolt insertion hole 14hh and the attachment hole 11ah of the tubular tether belt 11a are clamped and secured between the depressed part 16a of the airbag cover 16 and the central part 20a of the connecting member 20.

Then, by inserting the bolts 22d of the cushion ring 22 into the attachment holes 24c of the base plate 24 respectively, the cushion ring 22 is overlaid on the base plate 24 to thereby fit the base plate 24 to the airbag cover 16, and further the inflator 30 is snapped in between the bolts 22d, thereby screwing down a nut against the respective bolts 22d. By so doing, the inflator attachment opening 10ah and the protective member 12 are clamped and secured between the cushion ring 22, and the connecting member 20. As a result, assembling of the airbag device M1 shown in FIG. 2 is completed.

Figure 13A:
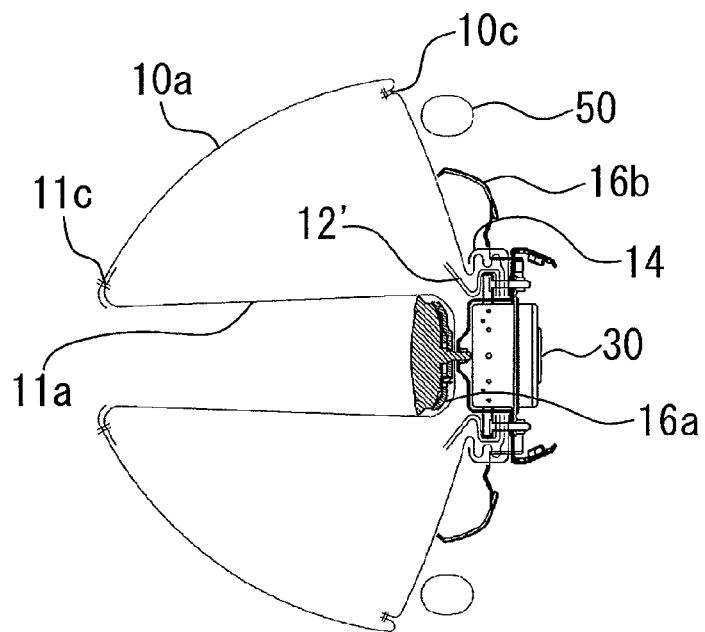
FIGS. 13A, 13B each are a view showing an expansion action of the airbag device.
Figure 13B:
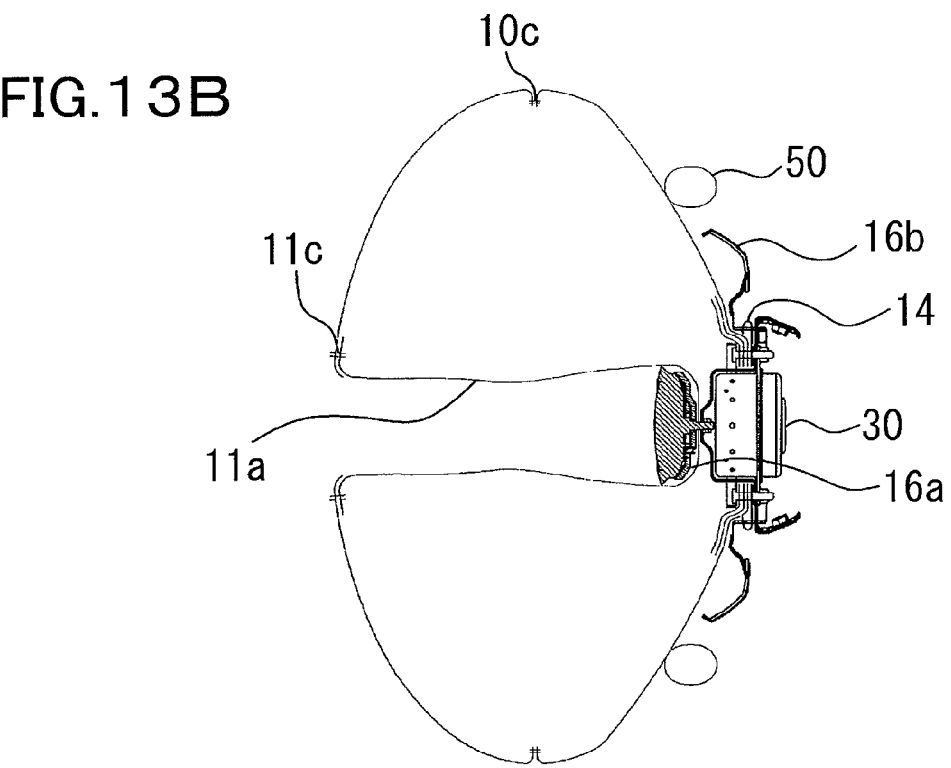

Referring to FIGS. 13A and 13B, there is described hereinafter an expanding action of the airbag device M1.

First, upon detection of an impact due to vehicle collision and so forth, ignition starts in the inflator 30 to thereby cause gas to be generated therein, and the gas is introduced into the airbag 10. When the airbag 10 starts inflation, the airbag cover 16 is subjected to a force of the inflation and is split along the tear-lines L1 to L4, and Lc, that is, with depressed part 16a as left out as it is, whereupon the respective cover pieces 16b will radially expand.

In the initial stage in which the gas is introduced into the doughnut-shaped airbag 10 and the airbag 10 starts to be inflated after the airbag cover 16 is split, as shown in FIG.

13A, inflation and expansion start from the stitched part 11c formed by stitching together the tubular tether belt 11a and the central part of the base fabric of the doughnut-shaped airbag 10 that will start inflation in the initial expansion, while enveloping the depressed part 16a with the tubular tether belt 11a, and the surface of the doughnut-shaped airbag 10 undergoes inflation toward the occupant side. Since the tubular tether belt 11a is folded in the longitudinal direction of the tube portion at the time of the inflation, the tubular tether belt 11a is hardly subjected to resistance upon extension thereof. When the doughnut-shaped airbag 10 undergoes inflation and expansion from the stitched part 11c, the airbag 10 undergoes expansion toward the occupant side while subjected to resistance upon passing through the anticipated rupture part 14h of the holding member 14. Accordingly, surface portion of the airbag 10 will sequentially be expanded toward the occupant side, while maintaining a degree of an internal pressure without causing halfway collapse of folded and contained airbag 10. FIG. 13A shows the fully stretched tubular tether belt 11a to its full length. Parts of the back side portion of the doughnut-shaped airbag 10 are inflated and expanded toward the occupant side, but the stitched part 10c formed by stitching together the respective outer circumferential edges of the two pieces of the base fabrics substantially circular in shape is positioned in the vicinity of the steering wheel 50, and other parts of the back side portion of the airbag 10 are still contained in the holding member 14. After the airbag has inflated to a degree, the position of the stitched part 10c shifts from the right-hand part of the figure toward the left as far as substantially the center along the center line of the tubular tether belt 11a, whereupon the airbag 10 is turned into the flat spherical shape, as shown in FIG. 13B, thereby completing the inflation and expansion.

As described hereinbefore, since the airbag folding device according to the present embodiment, and the airbag folding method using the same are made up as described above, the tubular tether belt 11a overlapping itself together with the airbag body 10a can be folded like bellows while being compressed, and the tubular tether belt 11a is folded in the longitudinal direction of the tube portion thereof in the initial stage where the folded doughnut-shaped airbag 10 starts to be inflated at the time of an impact, so that the doughnut-shaped airbag hardly meets resistance upon extension thereof, and undergoes sequential and orderly expansion starting from a region ought to be first expanded, thereby preventing punching phenomenon whereby the respective surface portions thereof burst out in a lump toward the occupant side.

With the airbag folding device according to the present embodiment, the doughnut-shaped airbag 10 is formed by compressing the airbag wherein the bolts 22d of the cushion ring 22 inserted into the small holes 10b provided on the peripheral part 10d around the inflator attachment opening 10ah of the airbag body 10a, respectively, are engaged with the four holes provided on the outer circumference of the support member 62 of the work table 61, on the upper end face thereof, so that the formed doughnut-shaped airbag 10, with the respective bolts of the cushion ring protruding therefrom, can be attached to the airbag cover, resulting enhancement in work efficiency.

Further, with the airbag folding device according to the present embodiment, it is possible to mechanically execute a work whereby the airbag body 10a and the tubular tether belt 11a are concurrently folded like bellows in the longitudinal direction thereof, thereby enabling productivity and cost effectiveness of the doughnut-shaped airbag 10 to be enhanced.

What is claimed is:

1. An airbag folding device for folding like bellows an airbag comprising an airbag body formed of front and back base fabrics to be in the shape of a bag, and a tubular tether belt extending from a central position of the front base fabric toward the interior of the bag in the longitudinal direction thereof, said airbag folding device comprising:
    a support member columnar in shape, inserted into the tubular tether belt, and vertically movable;
    an outer cylinder capable of storing the airbag body, disposed on the outside of the support member so as to be coaxial with the support member, and vertically movable;
    a work table provided with the support member and the outer cylinder; and
    a clamping member vertically movable, for clamping the tubular tether belt between the clamping member and the support member at a position straight above the support member, whereby the tubular tether belt and the airbag body are folded by causing the support member, the clamping member, and the outer cylinder to vertically move.

2. An airbag folding device according to claim 1, wherein the support member has an outside diameter smaller than a diameter of an inflator insertion opening of a cushion ring for attachment of the airbag, and bolts of the cushion ring inserted in small holes provided on a peripheral part around an inflator attachment opening of the airbag body, respectively, are engaged with holes provided on the periphery of the support member of the work table, on an upper end face thereof, respectively, thereby causing the airbag body to be supported by the work table.

3. An airbag folding device according to claim 2, wherein a tip of the support member is provided with a protruding part while the tubular tether belt is provided with an attachment hole, and the protruding part is inserted through the attachment hole.

4. An airbag folding device according to claim 1, wherein the tubular tether belt and airbag body are folded by causing the support member, the clamping member, and the outer cylinder to vertically move simultaneously and in the same direction relative to the work table.

5. An airbag folding device according to claim 1, wherein the outer cylinder extends out of the work table.

6. An airbag folding device according to claim 1, wherein the outer cylinder vertically moves into the work table when the tubular tether belt and the airbag body are folded.

* * * * *